United States Patent
Groft et al.

(10) Patent No.: US 6,790,500 B2
(45) Date of Patent: Sep. 14, 2004

(54) INSULATION WITH DEPRESSIONS AND METHOD THEREOF

(76) Inventors: Cory L. Groft, 301 St. Johns Rd., Littlestown, PA (US) 17340; Thomas W. Dauber, R.D. 2, Box 2387, Spring Grove, PA (US) 17362

( * ) Notice: Subject to any disclaimer, the term of this patent is extended or adjusted under 35 U.S.C. 154(b) by 16 days.

(21) Appl. No.: 10/205,224

(22) Filed: Jul. 26, 2002

(65) Prior Publication Data

US 2003/0021934 A1 Jan. 30, 2003

Related U.S. Application Data

(60) Provisional application No. 60/326,724, filed on Oct. 4, 2001, and provisional application No. 60/307,601, filed on Jul. 26, 2001.

(51) Int. Cl.[7] .................................................. B32B 3/00
(52) U.S. Cl. .................. 428/40.1; 52/309.16; 52/309.5; 52/408; 52/741.1; 52/745.13; 156/196; 156/209; 428/41.1; 428/41.3; 428/42.1; 428/141; 428/194; 428/163
(58) Field of Search ............................... 428/40.1, 41.1, 428/41.3, 42.1, 141, 194, 163, 40.9, 41.7, 41.8, 192, 156, 158, 160, 457, 317.1; 52/309.16, 309.5, 408, 741.1, 745.13, 302.1, 305.4; 156/196, 209

(56) References Cited

U.S. PATENT DOCUMENTS

| | | | |
|---|---|---|---|
| 3,468,086 A | 9/1969 | Warner | |
| 3,499,819 A | 3/1970 | Lewis | |
| 4,054,710 A | 10/1977 | Botsolas | |
| 4,073,998 A | 2/1978 | O'Connor | |
| 4,121,958 A | 10/1978 | Koonts | |
| 4,271,218 A | 6/1981 | Heckel et al. | |
| 4,726,985 A | 2/1988 | Fay et al. | |
| 5,100,725 A | 3/1992 | Pearson | |
| 5,316,835 A | 5/1994 | Groft et al. | |
| 5,369,926 A | * 12/1994 | Borland | 52/302.1 |
| 5,421,133 A | 6/1995 | Berdan, II et al. | |
| 5,787,668 A | * 8/1998 | Carkner | 52/408 |
| 5,840,392 A | * 11/1998 | Clark | 428/40.1 |
| 6,006,481 A | * 12/1999 | Jacobs | 52/309.9 |
| 6,125,597 A | 10/2000 | Hoffman et al. | |
| 6,128,879 A | 10/2000 | Bussey, Jr. et al. | |

* cited by examiner

Primary Examiner—Nasser Ahmad
(74) Attorney, Agent, or Firm—Nixon Peabody LLP; Daniel S. Song

(57) ABSTRACT

A multilayer insulation having a plurality of layers laminated together, and a plurality of depressions positioned proximate to edges of the multilayer insulation, the plurality of depressions forming insulated tabs on the multilayer insulation. An adhesive layer may be provided on one or more insulated tabs. In one embodiment, the depressions are positioned and sized to allow folding of the insulated tabs to form an integrated spacer. In another embodiment, the depressions are positioned and sized to allow receiving of an insulated tab of an adjacent insulation. In this regard, the depressions and the insulated tabs are preferably sized the same width to allow interlocking of the multilayer insulation to an adjacent multilayer insulation. A method of installing insulation is also described for providing an integrated spacer or interlocking adjacent insulation pieces. A method of manufacturing insulation with a depression that defines an insulated tab is also described.

46 Claims, 5 Drawing Sheets

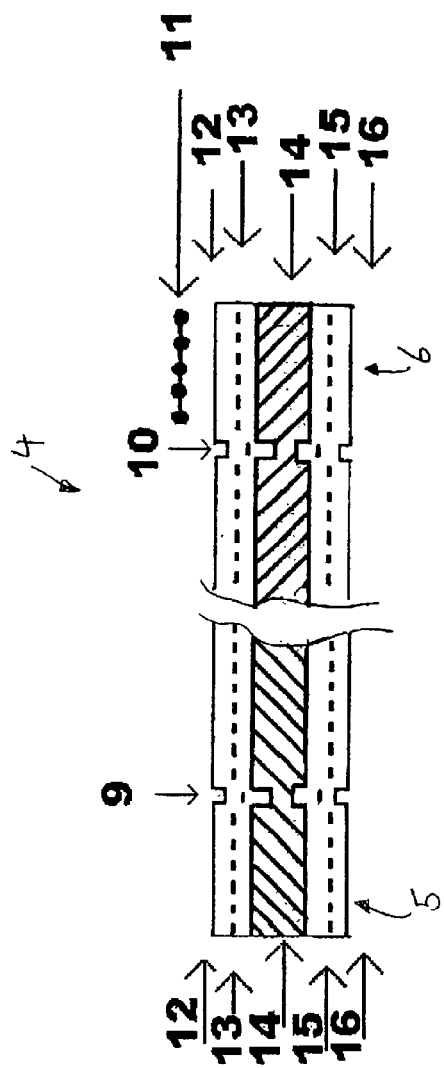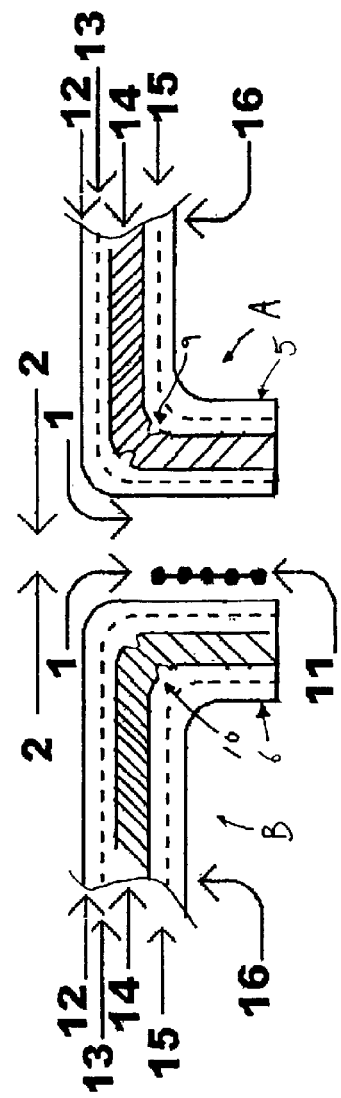

INSULATION WITH DEPRESSIONS AND METHOD THEREOF

This application claims priority to U.S. Provisional Application No. 60/307,601, filed Jul. 26, 2001 and U.S. Provisional Application No. 60/326,724, filed Oct. 4, 2001.

BACKGROUND OF THE INVENTION

1. Field of the Invention

The invention is generally related to the insulation arts and in particular, to insulation having a compressed depression and methods for using and making such an insulation.

2. Description of Related Art

In the past, fiberglass and blown foam insulation were the most common insulating materials found and used in the construction industry. After years of use, the industry has come to understand that these materials minimize heat loss and gain due to conductive or convective components of heat transfer. However, radiant energy transfer is virtually unaffected by theses materials. Yet radiant energy can account for up to 93% of summer heat gain, and up to 75% of winter heat loss.

Some insulation use metallic foils as part of an energy barrier system in homes. By providing a low emissivity aluminum foil on the exterior facing of the insulation, such insulation can lower radiant energy transfer while also providing conventional insulating properties. However, application of such insulation having metallic foils has been limited to use within internal walls and floors of the structure being constructed since these metallic foils, such as aluminum, are easily damaged and torn.

Furthermore, in various insulation applications, it is desirable to provide an air gap between the insulation itself and the wall or other surface of the structure being constructed. In order to maintain a constant air gap between the insulation and the wall, spacers are generally used. These spacers are installed on the wall together with the insulation so that the spacer is between the wall and the installed insulation thereby providing a constant air gap between the insulation and the wall. However, providing such spacers is expensive and cumbersome to install since they cannot be easily placed in the desired location during the installation process to maintain a constant air gap.

It is also a customary practice in the insulating industry to place the edges of the insulation next to each other, and then cover the seams between the adjacent pieces of insulation with tape or similar material. However, this practice leaves an area that is not insulated that allows air and vapor to pass which facilitates heat transfer, thereby diminishing insulation performance. Alternatively, the installer would go to the other extreme by overlapping the adjacent pieces of insulation, and stapling or taping the resulting overlapping seam closed. However, the applicants have found that this solution also creates problems of its own. In particular, the seam would then be twice as thick than the surrounding insulation and since the insulation material was not created to be used this manner, stress on the seam often causes areas of gapping and unsealing.

Therefore, there exists an unfulfilled need for an insulation and method which facilitates the provision of an air gap between the insulation and the surface of the structure being insulated. In addition, there also exists an unfulfilled need for an insulation and method of use which minimizes heat transfer through the seams of adjoining insulation material. There also exists an unfulfilled need for a method of manufacturing such an insulation.

SUMMARY OF THE INVENTION

Therefore, one advantage of the present invention is in providing an insulation which serves as a vapor barrier, as well as a radiant energy barrier.

Another advantage of the present invention is in providing an insulation and method that facilitates providing of an air gap between the insulation and the surface of the structure being insulated.

Still another advantage of the present invention is in providing an insulation and method of use which minimizes heat transfer through the seams of adjoining pieces of insulation.

Yet another advantage of the present invention is in providing a method of manufacturing insulation that forms a depression thereon.

These and other advantages are attained by multilayer insulation comprising a plurality of layers laminated together, and a plurality of depressions positioned proximate to edges of the multilayer insulation, the plurality of depressions forming insulated tabs on the multilayer insulation. In one embodiment of the present invention, the plurality of layers comprises at least a primary layer and second layers laminated to the primary layer, and third layers laminated to the second layers. In another embodiment, an adhesive layer is provided on at least one of the insulated tabs, the adhesive layer including a removable backing.

In one embodiment, the depressions are positioned and sized to allow folding of the insulated tabs to form an integrated spacer. In another embodiment, the depressions are positioned and sized to allow receiving of an insulated tab of an adjacent insulation. In this regard, the depressions and the insulated tabs are preferably sized to allow interlocking of the multilayer insulation to an adjacent multilayer insulation.

In another embodiment of the present invention, the primary layer is a foam layer or a bubble wrap layer made of polyethylene or polypropylene. The primary layer may be made of fiberglass in other embodiments. The second layers may be made of lineal low density polyethylene film having a thickness of approximately 0.001 inch. Preferably, at least one of the two third layers is made of a metallic foil that resist radiant energy transfer. For instance, the metallic foil may be made of 1100–1145 alloy wettable aluminum foil having a thickness in a range of approximately 0.00025 to 0.0005 inches. In still another embodiment, at least one of the two third layers is made of a vapor barrier film of polyethylene or polypropylene.

Preferably, the depressions are the same width as the insulated tabs. In this regard, in one embodiment, the depressions are approximately 0.125 of an inch to 2 inches in width and the insulated tabs are approximately 0.125 of an inch to 2 inches in width. In addition, the multilayer insulation is approximately 0.125 inch to 1.0 inch thick and the depressions are approximately 0.03125 to 0.0625 inch thick. The depressions may be formed with rollers approximately 0.125 of an inch to 2 inches in width that compress a portion of one or both surfaces of the multilayer insulation. In an alternative embodiment, the roller further applies heat to the portion of the multilayer insulation.

In accordance with another aspect of the present invention, a method of installing insulation is provided, the method including the steps of providing a plurality of pieces of insulation, each piece of insulation having a plurality of layers laminated together and a plurality of depressions that form corresponding insulated tabs positioned proximate to edges of each of the plurality of pieces of insulation, folding an insulated tab of one piece of insulation along a corresponding depression, and folding an insulated tab of an adjacent piece of insulation along a corresponding depression in a manner that the insulated tabs of the insulation pieces are aligned with one another.

The method of installing insulation in accordance with another embodiment may further include the step of adhering the aligned insulated tabs together to provide a sealed seam. In addition, the method may further include the step of abutting the adhered insulated tabs against a surface to be insulated to thereby provide an air gap between the multilayer insulation and the surface to be insulated.

In accordance with another aspect of the present invention, a method of installing insulation is provided including the steps of providing a plurality of pieces of insulation, each piece of insulation having a plurality of layers laminated together and a plurality of depressions that form corresponding insulated tabs positioned proximate to edges of each of the plurality of pieces of insulation, and interlocking the plurality of pieces of insulation together wherein an insulated tab of one piece of insulation is received in a depression of an adjacent piece of insulation, and an insulated tab of the adjacent piece of insulation is received in a depression of the one piece of insulation. The method of installation may further include the step of adhering the interlocked pieces of insulation to together to provide a sealed seam.

In accordance with still another aspect of the present invention, a method of manufacturing insulation is provided including the steps of laminating a plurality of insulation layers together, and compressing at least a portion of the insulation proximate to an edge of the insulation to form at least one depression on at least one surface of the insulation, the depression defining an insulated tab. In one preferred embodiment, the at least one depression is a plurality of depressions provided on both surfaces of the insulation. Of course, in other embodiments, the plurality of depressions may be provided on only one surface of the insulation.

In accordance with one method of manufacturing insulation of the present invention, the depression is formed by at least one roller that compresses the portion of the insulation. In the preferred embodiment, a plurality of rollers are positioned opposing each other in a manner that the insulation is received therein between. In yet another embodiment, the roller also applies heat to the portion of the insulation. In addition, the step of laminating the plurality of insulation layers together is attained using heat. Of course, in an alternative embodiment, the step of laminating the plurality of insulation layers together is attained using an adhesive.

These and other advantages and features of the present invention will become more apparent from the following detailed description of the preferred embodiments of the present invention when viewed in conjunction with the accompanying drawings.

BRIEF DESCRIPTION OF THE DRAWING FIGURES.

FIG. 1 shows a schematic separated view of the various layers of a multilayer insulation in accordance with one embodiment of the present invention.

FIG. 2 shows two separate pieces insulation in accordance with one embodiment, each piece of insulation being folded along the depressions to provide an insulated tab facing each other.

DETAILED DESCRIPTION OF THE PREFERRED EMBODIMENT

Figure 3:
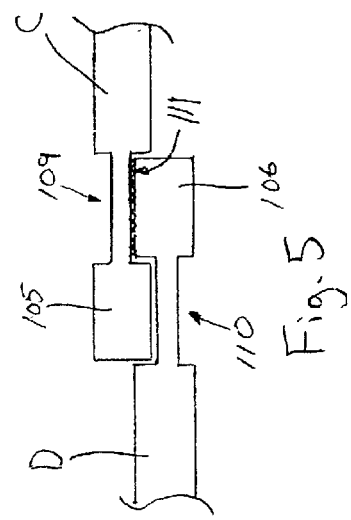
FIG. 3 shows two separate pieces of insulation of FIG. 2 with the insulating pieces adhered together to provide a self-sealed seam and a spacer that provides an air gap when the insulation is installed.

FIG. 1 shows a schematic separated view of the various layers of insulation 4 in accordance with one embodiment of the present invention which may be used in the manner described in detail further below to provide various advantages previously noted. It should be noted that insulation 4 is shown segmented in two separate pieces to show various features of the insulation 4 most clearly since in the preferred embodiment, the insulation 4 would be relatively wide and in sheets, or rolls.

In addition, in practice of the present invention, the various layers of the insulation 4 would be laminated together to provide a multilayer insulation, for instance by flame or heat roller lamination, or by adhesive lamination. Moreover, whereas only five layers are shown in the embodiment of FIG. 1, it should be noted that in other embodiments, different number of layers may be provided as well. In this regard, each of the layers are discussed below to show the preferred embodiment of the insulation 4 which have been found to be very effective and versatile in the construction industry. However, the present invention should not be strictly limited to the layers described.

In the preferred embodiment, the primary layer 14 of the insulation 4, may be comprised of a foam layer or a bubble wrap layer in which plurality of individual chambers of trapped air is provided. The foam layer or the bubble wrap layer may be made of polyethylene or polypropylene. Of course, in other embodiments, the primary layer 14 may be made of other insulating materials, such as fiberglass. Various thicknesses may be used ranging from 0.125 inch to 1.0 inch thick, or other thickness. Second layers 13 and 15 are preferably films that are bonded to the surfaces of the primary layer 14. In this regard, second layers 13 and 15 are preferably lineal low density polyethylene film or other equivalent material having a thickness of, for instance, 0.001 inch.

In the illustrated embodiment, two third layers 12 and 16 are provided on the outside of the second layers 13 and 15. In one embodiment, the two third layers 12 and 16 are made of metallic foil that resist radiant energy transfer thereby minimizing radiative heat transfer through the insulation 4. For instance, the third layers 12 and 16 are made of high purity aluminum foil having very low emissivity such as 1100–1145 alloy wettable aluminum having a thickness of 0.00025 to 0.0005 inches. In such an embodiment, the second layers 13 and 15 strengthen the third layers 12 and 16 so that the metallic foil does not readily tear or become damaged during shipping, handling and installation of the insulation 4. Moreover, depending on the insulation requirements and application, one of the third layers 12 and 16, or both, may be a vapor barrier film that may be made of white polyethylene or other equivalent material, for example.

In accordance with the present invention, the insulation 4 includes depressions 9 and 10 near the outer edges of the insulation 4. In the illustrated embodiment of FIG. 1, depressions 9 and 10 are formed on both of the planar surfaces of the insulation 4. The depressions 9 and 10 form insulated tabs 5 and 6 on the insulation 4 in the manner shown in FIG. 1. In the illustrated example, the insulation 4 has constant thickness except in the depressions 9 and 10. In one preferred embodiment, the depressions 9 and 10 are approximately 0.125 of an inch to 2 inches in width, and are between 0.125 inch to 2 inches from the outer edges of the insulation 4. In the illustrated embodiment, the depressions 9 and 10 are approximately 0.125 inch in width to allow the insulated tabs 5 and 6 to be folded and used in the manner further described below.

The depth of the depressions 9 and 10 will vary depending on the original thickness of the primary layer 14 but has sufficient depth to allow the insulation 4, and the insulated tabs 5 and 6 to be advantageously used in the manner further described below. In an embodiment where the thickness of the primary layer 14 is approximately 1.0 inch, the section of the insulation 4 may be approximately 0.03125 to 0.0625 inch in thickness at depressions 9 and 10. Of course, in other embodiments, the thickness of the depressions 9 and 10 may be more than the range described.

As also shown in FIG. 1, the insulation 4 is also provided with a strip of adhesive 11 on one surface of the insulation 4 such as adhesive tape or the like, above the outer layer 12, which again, may be a metallic foil or vapor barrier film. The adhesive 11 is provided on insulated tab 6 between the outer edge of the insulation 4 and the depression 10 in the illustrated embodiment. The adhesive 11 may be paper backed so that the paper may be removed to expose the adhesive 11 at the time of installation.

Of course, it should be readily appreciated that the above described thicknesses of the various layers as well as dimensions of the compressed depressions and the position thereof are merely provided as an illustrative example only and these parameters may vary depending on the specific application of the insulation. In addition, various different materials may be used for the various layers, and the insulation product may be provided with different number of layers as well.

One advantageous use of insulation 4 in accordance with the present invention is that the depressions 9 and 10 may be used to create integrated spacers that provide an air gap between the insulation 4 and the surface of the structure being insulated. In this regard, FIG. 2 shows two separate pieces A and B of the insulation, each like the insulation 4 shown and discussed relative to FIG. 1. In this regard, insulation piece A may be from the same insulation roll as insulation piece B. Correspondingly, common reference numerals used in FIG. 1 are used to designate the same components of the two insulation pieces A and B. Of course, in actuality, the various layers shown in FIG. 2 would be laminated together.

In accordance with one embodiment of the present invention, the insulated tab 5 of insulation piece A is folded along the depression 9 so that the insulated tab 5 extends outwardly substantially perpendicular to the plane of the insulation piece A as shown in FIG. 2. In a similar manner, the insulated tab 6 of insulation piece B is folded along the depression 10 so that the insulated tab 6 extends outwardly substantially perpendicular to the plane of the insulation piece B. The direction arrow 1 demonstrates how the insulated tabs are folded along their respective depressions. Thus, as shown, the insulated tabs 5 and 6 of insulation pieces A and B respectively, are folded so that they are adjacent to one another.

As also shown in FIG. 2, because insulated tab 6 of insulation piece B is provided with the adhesive 11, the adhesive is between the folded insulated tabs 5 and 6 as shown. Any protective covering for the adhesive 11 may then be removed and the two insulation pieces A and B brought together as indicated by direction arrows 2 and pressed together. This provides a self-sealing seam between the insulation piece A and insulation piece B which minimizes heat transfer through the seam.

Moreover, FIG. 3 shows the two separate pieces of insulation A and B of FIG. 2 but with the layers laminated together. As shown, the insulated tabs 5 and 6 are adhered together thereby forming spacer "S" that provides a built in air gap "G" between the insulation pieces A and B, and the wall "W" to which the insulation pieces are installed. In particular, the insulated tabs 5 and 6 which are adjoined together by adhesive 11 extend outwardly from the plane of the insulation pieces in the manner shown so that the tip of the insulated tabs 5 and 6 can be placed to abut the wall W being insulated so as to provide the air gap G between the wall W and the insulation.

As can now be appreciated, the depressions 9 and 10 allow insulation pieces A and B to be folded in the manner shown so as to provide insulated tabs 5 and 6 respectively. The depressions 9 and 10 provide a visual indicator for the installer to fold the insulation pieces A and B properly. In this regard, the depressions 9 and 10 also acts to physically facilitate the folding of the insulation pieces A and B so that the insulated tabs 5 and 6 formed are substantially similar in dimension, in both unfolded and folded configuration. As shown in FIG. 3, providing insulated tabs 5 and 6 which are substantially the same dimension is especially desirable since it aids in the rigidity and stability of the spacer S formed by the tabs. In addition, this also ensures that the air gap G provided between the wall W and the insulation is substantially consistent.

The present invention, when used in the manner as described above, minimizes cost since a separate spacer is not required. In addition, the present invention also facilitates installation of the insulation while providing the air gap G as compared to the conventional method. The present invention further provides a sealed seam between the insulation pieces to thereby minimize heat transfer through the seam and increase performance of the installed insulation.

Thus, insulation 4 in accordance with the illustrated embodiment of the present invention as shown in FIGS. 1 to 3 provides a multilayer insulation product with enhanced product strength and a self-sealing seam in which an insulated tab may be used to form a spacer S to create a continuous air gap G between the insulation 4 and the wall W to which the insulation is applied, thereby improving the insulating ability of the product.

Figure 4:
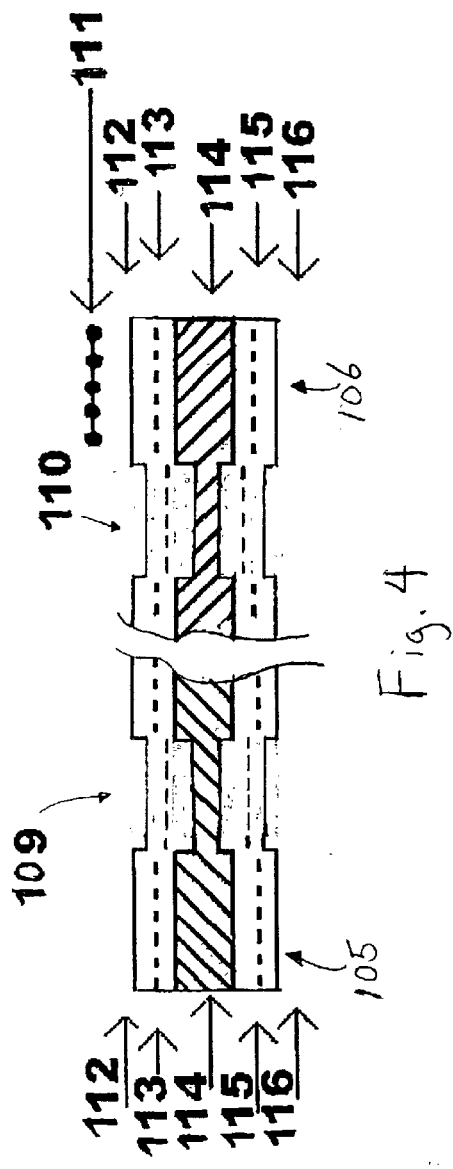
FIG. 4 shows an insulation in accordance with another embodiment of the present invention having wider depressions.

FIG. 4 shows insulation 104 in accordance with another embodiment of the present invention which is similar to insulation 4 shown in FIG. 1. In this regard, insulation 104 includes a primary layer 114 that is preferably comprised of a foam layer of polyethylene or polypropylene, or other insulating material, such as fiberglass. Second layers 113 and 115 are films, such as lineal low density polyethylene film or other equivalent material, which are bonded to the surfaces of the primary layer 114. On the outside of the second layers 113 and 115, two third layers 112 and 116 made of metallic foil such as aluminum foil, and/or a vapor barrier film of white polyethylene are provided thereon.

The illustrated insulation 104 is also provided with depressions 109 and 110 on both surfaces of the insulation 104 on both surfaces near the edges. In contrast with the previous embodiment described above, the depressions 109 and 110 are much larger in width, for instance approximately 2 inches. The depressions 109 and 110 form insulated tabs 105 and 106 respectively as shown, insulated tab 106 having adhesive 111 on one surface thereof. In this regard, the insulated tabs 105 and 106 may be approximately 0.125 of an inch to 2 inches in width, but is preferably the same width as the depressions 109 and 110, for instance, 2 inches.

Figure 5:
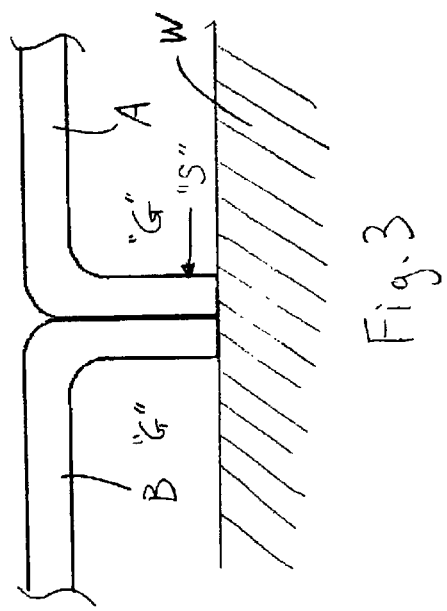
FIG. 5 shows two separate pieces of insulation of FIG. 4 with the insulation pieces interlocked and adhered together to provide a self-sealed seam.

FIG. 5 shows two separate pieces C and D of the insulation, each like the insulation 104 shown and discussed relative to FIG. 4. In this regard, insulation piece C may be from the same insulation roll as insulation piece D. As shown in FIG. 5, insulation piece C is interlocked with insulation piece D by positioning the insulation pieces relative to each other so that the insulated tab 105 of insulation piece C is received in the depression 110 of insulation D, and the insulated tab 106 of insulation piece D is received in the depression 109 of insulation C. Moreover, in the illustrated embodiment, the adhesive 111 provided on the insulated tab 106 is used to securely adhere the insulated tab 106 to the depression 109. This provides a sealed seam between the insulation pieces C and D that minimizes heat transfer through the seam. Moreover, because of the interlocking geometry, the thickness of the overlapping insulation pieces C and D are reduced. This reduces some of the stress on the seam thereby also reducing the propensity for gapping and unsealing as described in the discussion of the known art.

Figure 6:
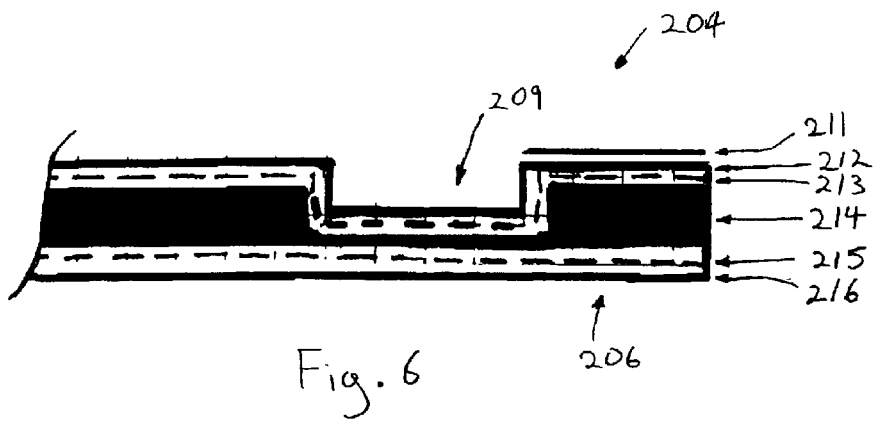
FIG. 6 shows an insulation in accordance with yet another embodiment of the present invention having a depression on only one surface of the insulation.

FIG. 6 shows insulation 204 in accordance with yet another embodiment of the present invention, only one edge of the insulation 204 being shown. Insulation 204, like the previously described embodiments, includes a primary layer 214 that is preferably comprised of a foam layer of polyethylene or polypropylene, or other insulating material, such as fiberglass. Second layers 213 and 215 are films, such as lineal low density polyethylene film that are bonded to the surfaces of the primary layer 214. On the outside of the second layers 213 and 215, two third layers 212 and 216 made of metallic foil such as aluminum foil, or a vapor barrier film of white polyethylene are provided. Again, whereas each of the layers are shown in a schematic separated view, in practice, the layers would be laminated together to provide a multilayer insulation.

The illustrated insulation 204 is also provided with depressions, only depression 209 being shown since only one edge of the insulation 204 is illustrated. A similar depression may be provided on the other edge of the insulation 204. The depression 209 forms an insulated tab 206 which is provided with an adhesive 211 that may have a paper backing that is removed for installation of the insulation 204. The depression 209 is preferably wide like the depressions 109 and 110 described above relative to FIG. 4. However, in contrast with the previous embodiments described above, the depression 209 is only provided on one surface of the insulation 204 instead of on both surfaces. Of course, the depression at the opposite edge of the insulation 204 may be provided on an opposite surface than the surface of depression 209 in other embodiments. Regardless, in this embodiment, the depression 209 is provided on only one surface of the insulation 204.

Figure 7:
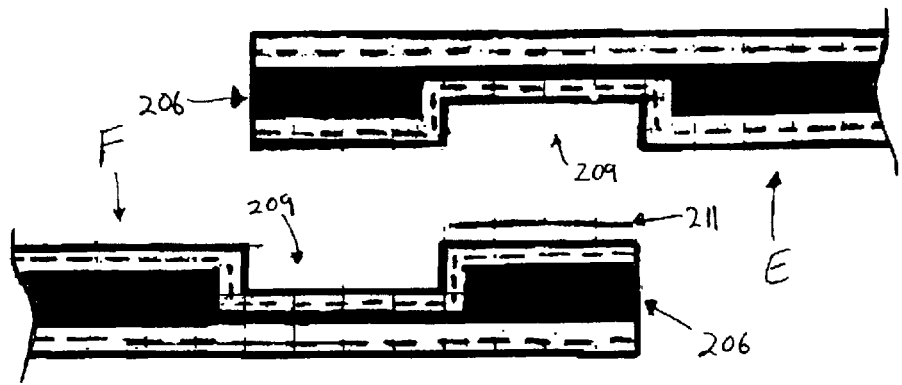
FIG. 7 shows two separate pieces of insulation of FIG. 6 that are positioned to provide a self-sealed seam when installed.
Figure 8:
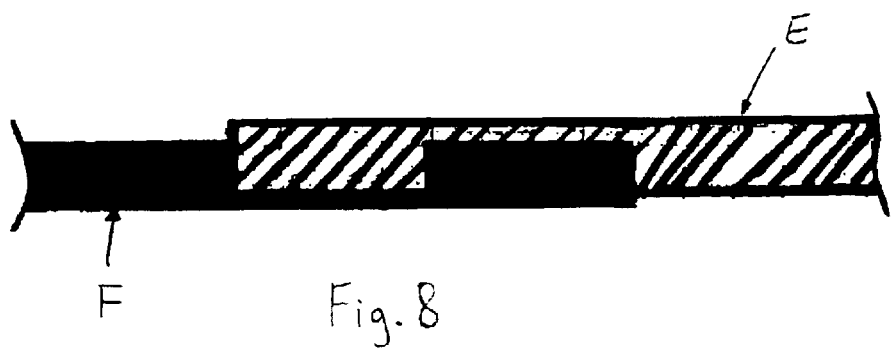
FIG. 8 shows the two separate pieces of insulation of FIG. 7 with the insulation pieces interlocked and adhered together to provide a self-sealed seam.

FIGS. 7 and 8 show two separate pieces E and F of the insulation, each like the insulation 204 shown and discussed relative to FIG. 6, FIG. 8 showing the insulation pieces in their laminated form. In this regard, insulation piece E may be from the same insulation roll as insulation piece F. As shown most clearly in FIG. 8, the insulation piece E is interlocked with insulation piece F by positioning the insulation pieces relative to each other so that insulated tab of one insulation piece is received in the depression of the other insulation piece. Again, the adhesive 211 is used to securely the two insulation pieces F and G together to provide a sealed seam that minimizes heat transfer through the seam.

Furthermore, it should be also appreciated that this embodiment of the present invention provides an interlocking geometry where the thickness of the overlapping insulation pieces F and G are even more reduced than the embodiment shown in FIG. 5. Correspondingly, the embodiment of FIGS. 6 to 8 greatly reduces the stress on the seam thereby also reducing the propensity for gapping and unsealing.

Figure 9:
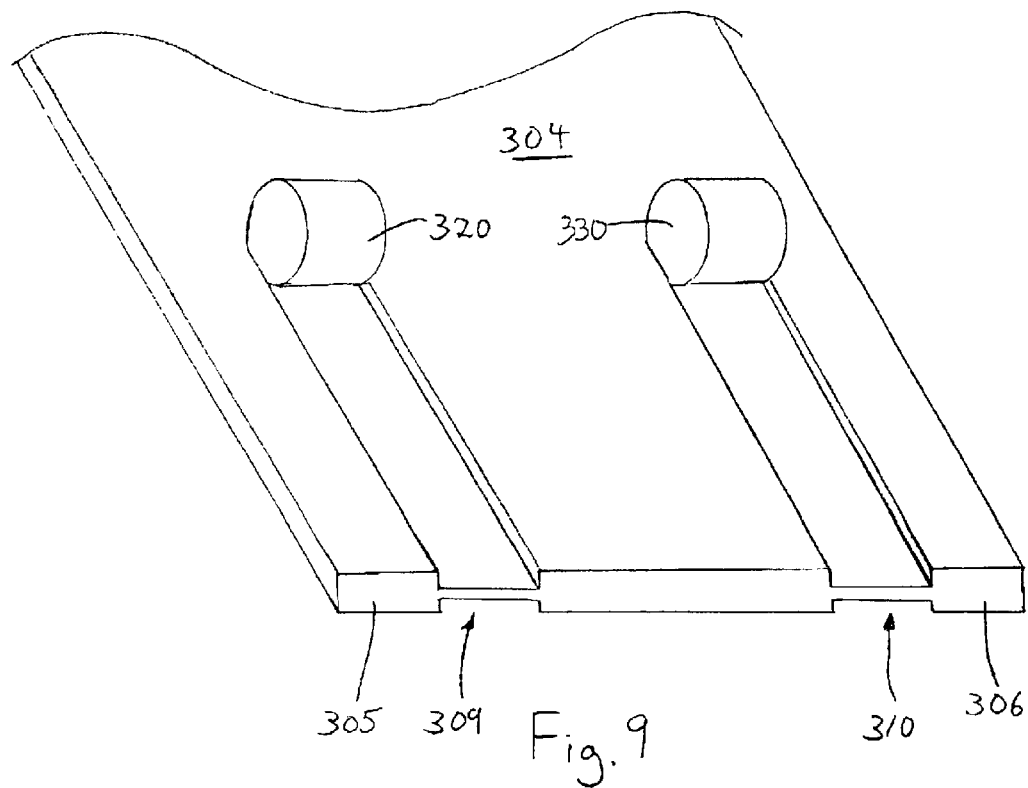
FIG. 9 shows a perspective view of an insulation in which depressions are being formed on both surfaces by rollers in accordance with one method of the present invention.
Figure 10:
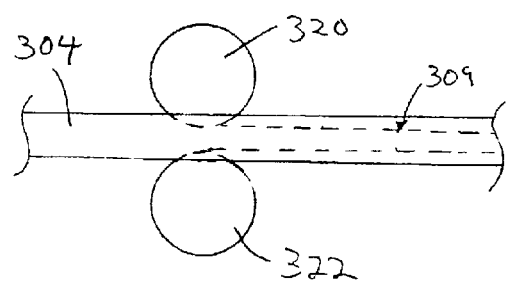
FIG. 10 shows a side profile view of the insulation in FIG. 9 in which depressions are being formed thereon by rollers.

In the above described embodiments of the present invention, the depressions provided on the insulation may be formed in any appropriate manner. For instance, the primary layer may be formed with such depressions before the various other layers are laminated thereto. However, in one preferred embodiment as shown in FIGS. 9 and 10 described below, the depressions are preferably formed on the insulation surfaces after lamination of the various other layers. In particular, insulation 304 is a multilayer insulation in accordance with the present invention in which the various layers of insulation 304 has been laminated, for instance, by heat or adhesive lamination.

The insulation 304 may then, be run between rollers which form the depressions thereon. As most clearly shown in FIG. 10, the insulation 304 is run between roller 320 and 322 that compress the insulation 304 near an edge of the insulation 304 thereby forming the depression 309 and the insulated tab 305. The rollers 320 and 322 are preferably positioned so that they oppose each other on each planar surface of the insulation 304 in the manner shown, and to provide the insulated tab 305 and depression 309 that has the desired dimension and position from the corresponding edge. Roller 330 and a corresponding additional roller (not shown) on the other surface of the insulation 304 that together compress insulation 304 near the other edge of the insulation 304 thereby forming the depression 310 and the insulated tab 306.

Depending on the insulation core being used, the above described rollers may apply pressure and/or heat to form the depressions on the insulation 304. The amount of compression of the insulation 304 would determine the depth of the resulting depressions 309 and 310. Of course, the rebound characteristics of the insulation 304 should be taken into account so that the insulation 304 is compressed appropriately. The width of the rollers would determine the width of the resulting depressions. In this regard, the rollers may be 0.125 of an inch to 2 inches in width. Rollers 0.125 inch wide would provide corresponding narrow depressions such as that described relative to insulation 4 of FIG. 1 which may be used to facilitate folding of the insulation to provide a spacer as described relative to FIG. 2. Rollers 2 inches wide would provide corresponding wider depressions such as that described relative to insulation 104 of FIG. 4. Of course, in other embodiments, the width of the roller may be a different.

In addition, in the illustrated embodiment of FIGS. 9 and 10, the insulation 304 is of the type shown in FIGS. 1 and 4 in which the depressions are on both surfaces of the insulation 304. However, in other embodiments, rollers may be provided to compress only one surface of the insulation to yield insulation of the type shown in FIG. 6.

Figure 11:
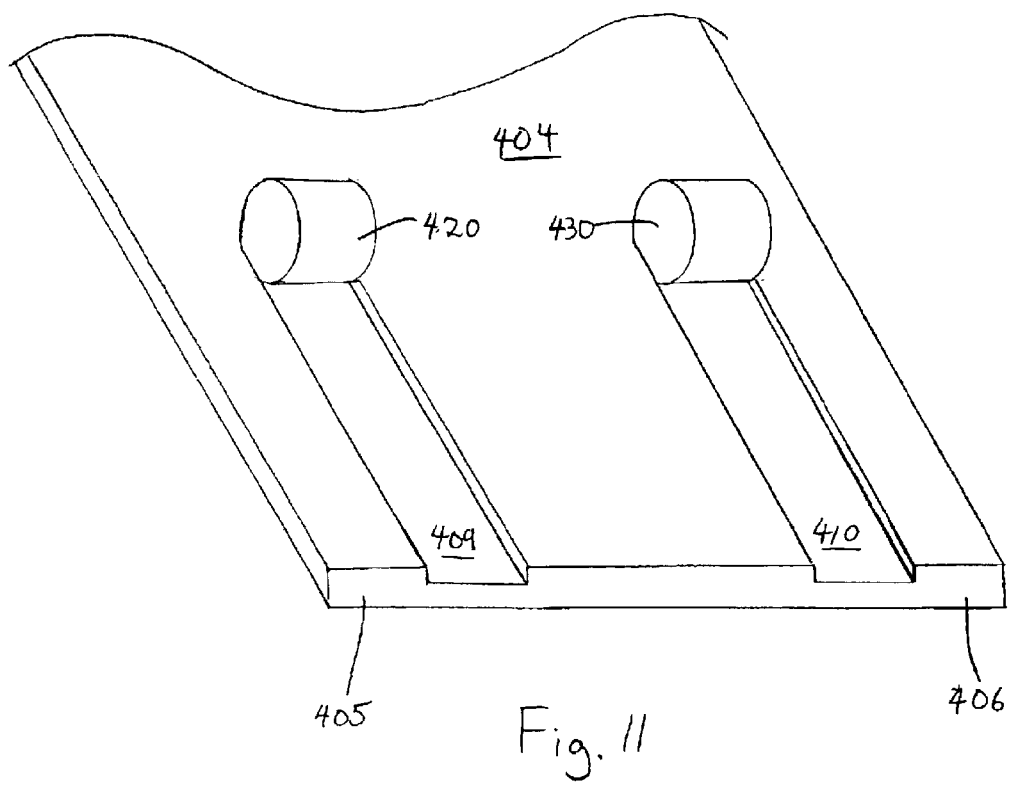
FIG. 11 shows a perspective view of an insulation in which depressions are being formed on one surface by rollers in accordance with another method of the present invention.
Figure 12:
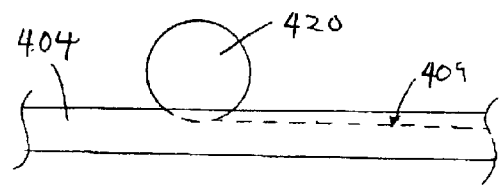
FIG. 12 shows a side profile view of the insulation in FIG. 9 in which depressions are being formed thereon by rollers.

In the above regard, FIGS. 11 and 12 illustrate how multilayer insulation 404 of the type shown in FIG. 6 may be manufactured. As described relative to FIGS. 9 and 10, the depressions 409 and 410 are preferably formed on the insulation surfaces after lamination of the various other layers, for instance, by heat or adhesive lamination. As shown, the depressions 409 and 410 are formed on only one surface of the insulation 404.

The insulation 404 may then, be run between rollers 420 and 422 that compress the insulation 404 near edges of the insulation 404 thereby forming the depression 409 and 410, respectively, which in turn, provide the insulated tabs 405 and 406 respectively. Depending on the insulation core being used, the above described rollers may apply pressure and/or heat to form the depressions on the insulation 404. The amount of compression of the insulation 404 would determine the depth of the resulting depressions 409 and 410, and the width of the rollers would determine the width of the resulting depressions. In this regard, the rollers may be 0.125 of an inch to 2 inches in width.

The above described insulation, insulation method, and method of manufacture in accordance with the present invention may be applied to a multitude of areas in a structure including roofs, floors, walls, crawl spaces, attics, and many other areas that would benefit from the use of insulation. In view of the above, it should now be evident to one of ordinary skill in the art that the present invention provides many advantages over insulation, insulation method, and manufacture method of the prior art. The present invention provides insulation which serves as a vapor barrier, as well as a radiant energy barrier. In addition, installation of the insulation is simplified and costs are reduced, especially in embodiments where an air gap is desired because the present invention provides an integrated spacer. Moreover, the insulation in accordance with the present invention minimizes heat transfer through the seams of adjoining pieces of insulation by providing an overlaying, self-sealing seam. In this regard, the adjoining pieces of insulation may be interlocked together to decrease thickness of the overlapping insulation pieces which results in reducing the propensity for gapping and unsealing.

While various embodiments in accordance with the present invention have been shown and described, it is understood that the invention is not limited thereto. The present invention may be changed, modified and further applied by those skilled in the art. Therefore, this invention is not limited to the detail shown and described previously, but also includes all such changes and modifications.

What is claimed is:

1. A rollable multilayer insulation comprising:
   a plurality of layers laminated together, said plurality of layers including at least a primary layer and second layers laminated to surfaces of said primary layer; and
   a plurality of continuous depressions provided on at least one lateral surface of said multilayer insulation, said plurality of continuous depressions being positioned proximate to edges of said multilayer insulation, said plurality of continuous depressions forming insulated tabs on said multilayer insulation;
   wherein said plurality of depressions have a width dimension of approximately 0.125 of an inch to 2 inches to allow said insulated tabs to be folded substantially perpendicular to said at least one lateral surface of multilayer insulation so as to provide an integrated spacer that abuts a wall surface.

2. The multilayer insulation of claim 1, wherein said plurality of layers further comprises third layers laminated to said second layers.

3. The multilayer insulation of claim 1, further including an adhesive layer provided on at least one of said insulated tabs.

4. The multilayer insulation of claim 3, wherein said adhesive layer includes a removable backing.

5. The multilayer insulation of claim 1, wherein said depressions are positioned and sized to receive an insulated tab of an adjacent insulation.

6. The multilayer insulation of claim 1, wherein said depressions and insulated tabs are sized to interlock said multilayer insulation to an adjacent multilayer insulation.

7. The multilayer insulation of claim 1, wherein said primary layer is at least one of a foam layer and a bubble wrap layer.

8. The multilayer insulation of claim 7, wherein said primary layer is made of at least one of polyethylene and polypropylene.

9. The multilayer insulation of claim 1, wherein said second layers are made of lineal low density polyethylene film.

10. The multilayer insulation of claim 9, wherein said lineal low density polyethylene film has a thickness of approximately 0.001 inch.

11. The multilayer insulation of claim 1, wherein at least one of said two third layers is made of a metallic foil that resist radiant energy transfer.

12. The multilayer insulation of claim 11, wherein said metallic foil is made of aluminum foil.

13. The multilayer insulation of claim 12, wherein said aluminum foil is 1100–1145 alloy wettable aluminum.

14. The multilayer insulation of claim 12, wherein said aluminum foil has a thickness in a range of approximately 0.00025 to 0.0005 inches.

15. The multilayer insulation of claim 1, wherein at least one of said two third layers is made of a vapor barrier film.

16. The multilayer insulation of claim 15, wherein said vapor barrier film is made of at least one of polyethylene and polypropylene.

17. The multilayer insulation of claim 1, wherein said depressions are the same width as said insulated tabs.

18. The multilayer insulation of claim 1, wherein said insulated tabs are approximately 0.125 of an inch to 2 inches in width.

19. The multilayer insulation of claim 1, wherein said multilayer insulation is approximately 0.125 inch to 1.0 inch thick.

20. The multilayer insulation of claim 1, wherein said depressions are approximately 0.03125 to 0.0625 inch thick.

21. The multilayer insulation of claim 1, wherein said depressions are formed with rollers that compress a portion of at least one surface of said multilayer insulation.

22. The multilayer insulation of claim 21, wherein said rollers are approximately 0.125 of an inch to 2 inches in width and compress both surfaces of said multilayer insulation.

23. The multilayer insulation of claim 21, wherein said at least one roller further applies heat to said portion of said multilayer insulation.

24. A method of installing rollable insulation including the steps of:
   providing a plurality of pieces of insulation, each piece of insulation having a plurality of layers laminated together and a plurality of continuous depressions that form corresponding insulated tabs positioned proximate to edges of each of said plurality of pieces of insulation;
   folding an insulated tab of one piece of insulation along a corresponding depression so that said insulated tab projects substantially perpendicularly to remainder of said piece of insulation; and
   folding an insulated tab of an adjacent piece of insulation along a corresponding depression so that said insulated tab projects substantially perpendicularly to said piece of insulation in a manner that said insulated tabs of the insulation pieces are aligned with one another.

25. The method of claim 24, further including the step of adhering said aligned insulated tabs together to provide a sealed seam.

26. The method of claim 24, wherein said insulated tabs are approximately 0.125 of an inch to 2 inches in width.

27. The method of claim 26, further including the step of abutting said adhered insulated tabs against a surface to be insulated to thereby provide an air gap between said multilayer insulation and the surface to be insulated.

28. The method of claim 24, wherein said depressions are positioned approximately 0.125 of an inch to 2 inches from an edge of said plurality of insulation pieces.

29. The method of claim 24, wherein said depressions are the same width as said insulated tabs.

30. The method of claim 24, wherein said plurality of layers comprises at least a primary layer, second layers laminated to surfaces of said primary layer, and third-layers laminated to said second layers.

31. A method of installing rollable insulation including the steps of:
   providing a plurality of pieces of insulation, each piece of insulation having a plurality of layers laminated together and a plurality of depressions that form corresponding insulated tabs positioned proximate to edges of each of said plurality of pieces of insulation; and
   interlocking said plurality of pieces of insulation together wherein an insulated tab of one piece of insulation is received in a depression of an adjacent piece of insulation, and an insulated tab of the adjacent piece of insulation is received in a depression of said one piece of insulation such that said one piece of insulation overlaps the adjacent piece of insulation, and the thickness of the overlapping pieces of insulation is less than twice the thickness of said one piece of insulation.

32. The method of claim 31, further including the step of adhering said interlocked pieces of insulation together to provide a sealed seam.

33. The method of claim 31, wherein said insulated tabs are approximately 0.125 of an inch to 2 inches in width.

34. The method of claim 31, wherein said depressions are positioned approximately 0.125 of an inch to 2 inches from an edge of said plurality of insulation pieces.

35. The method of claim 31, wherein said plurality of layers comprises at least a primary layer, second layers laminated to surfaces of said primary layer, and third layers laminated to said second layers.

36. The method of claim 31, wherein said depressions are the same width said insulated tabs.

37. The method of manufacturing a rollable, multilayer insulation comprising the steps of:
   laminating a plurality of insulation layers together; and
   compressing at least a portion of said insulation proximate to an edge of said insulation to form at least one continuous depression on at least one lateral surface of said insulation, said depression defining an insulated tab;
   wherein said at least one continuous depression is formed by at least one roller that compresses said portion of said insulation.

38. The method of claim 37, wherein said at least one depression is a plurality of depressions.

39. The method of claim 38, wherein said plurality of depressions are provided on both surfaces of said insulation.

40. The method of claim 38, wherein said plurality of depressions are provided on only one surface of said insulation.

41. The method of claim 38, wherein said at least one roller is plurality of rollers positioned opposing each other in a manner that said insulation is received therein between.

42. The method of claim 37, wherein said at least one roller also applies heat to said portion of said insulation.

43. The method of claim 37, wherein said step of laminating said plurality of insulation layers together is attained using heat.

44. The method of claim 37, wherein said step of laminating said plurality of insulation layers together is attained using an adhesive.

45. A rollable, multilayer insulation comprising:
   a plurality of layers laminated together, said plurality of layers including at least a primary layer and second layers laminated to surfaces of said primary layer; and
   a plurality of depressions provided on at least one lateral surface of said multilayer insulation, said plurality of depressions being formed by compressing said multilayer insulation proximate to edges thereof, said plurality of depressions forming insulated tabs on said multilayer insulation;
   wherein said plurality of depressions are positioned and sized to receive an insulated tab of an adjacent insulation in an overlapping, interlocked manner so that said piece of insulation overlaps an adjacent piece of insulation, the thickness of the overlapping pieces of insulation being less than the sum of the thickness of the one piece of insulation and the thickness of the adjacent pieces of insulation.

46. The multilayer insulation of claim 45, wherein said primary layer is made of at least one of polyethylene and polypropylene, said second layers are made of lineal low density polyethylene film laminated to said primary layer, and further including third layers laminated to said second layers, at least one of said third layers being made of 1100–1145 alloy wettable aluminum foil that resist radiant energy transfer.

* * * * *